United States Patent
Bathurst et al.

(10) Patent No.: US 9,215,327 B2
(45) Date of Patent: Dec. 15, 2015

(54) METHODS AND APPARATUSES FOR MULTI-CHANNEL ACOUSTIC ECHO CANCELATION

(75) Inventors: Tracy A. Bathurst, South Jordan, UT (US); Derek Graham, South Jordan, UT (US); Michael Braithwaite, Austin, TX (US); Russel S. Ericksen, Spanish Fork, UT (US); Brett Harris, Orem, UT (US); Sandeep Kalra, Salt Lake City, UT (US); David K. Lambert, South Jordan, UT (US); Peter H. Manley, Draper, UT (US); Ashutosh Pandey, Murray, UT (US); Bryan Shaw, Morgan, UT (US); Michael Tilelli, Syracuse, UT (US); Paul R. Bryson, Austin, TX (US)

(73) Assignee: ClearOne Communications, Inc., Salt Lake City, UT (US)

( * ) Notice: Subject to any disclaimer, the term of this patent is extended or adjusted under 35 U.S.C. 154(b) by 645 days.

(21) Appl. No.: 13/493,943

(22) Filed: Jun. 11, 2012

(65) Prior Publication Data

US 2013/0083911 A1    Apr. 4, 2013

Related U.S. Application Data

(60) Provisional application No. 61/495,982, filed on Jun. 11, 2011.

(51) Int. Cl.
| | |
|---|---|
| *G10K 11/16* | (2006.01) |
| *H04M 3/56* | (2006.01) |
| *H04M 9/08* | (2006.01) |
| *H04M 3/00* | (2006.01) |
| *H04B 3/20* | (2006.01) |

(52) U.S. Cl.
CPC ............... *H04M 3/56* (2013.01); *H04M 3/002* (2013.01); *H04M 3/568* (2013.01); *H04M 9/082* (2013.01)

(58) Field of Classification Search
CPC ......... H04M 9/082; H04M 9/08; H04M 3/56; H04M 3/002; H04M 3/568; G10L 19/008; H04R 3/005; H04R 3/02; H04R 1/1083; H04S 7/30
USPC ....................... 381/66, 71.1–71.2, 92, 1, 119; 379/406.03, 406.08, 158; 700/94
See application file for complete search history.

(56) References Cited

U.S. PATENT DOCUMENTS

| | | | | |
|---|---|---|---|---|
| 2006/0239443 | A1* | 10/2006 | Oxford et al. | ............ 379/406.01 |
| 2008/0267420 | A1* | 10/2008 | Fozunbal | ........................ 381/66 |

OTHER PUBLICATIONS

Panning ( audio), Wikipedia.org, 2007.*

* cited by examiner

*Primary Examiner* — Vivian Chin
*Assistant Examiner* — Ammar Hamid
(74) *Attorney, Agent, or Firm* — TraskBritt, P.C.

(57) ABSTRACT

Embodiments include methods and apparatuses for echo cancelation involving multiple audio channels and the production, sensing, or a combination thereof of multiple audio channels in conferencing systems. A conferencing apparatus with a plurality of speakers configured to generate outgoing acoustic waves responsive to a multi-channel audio signal. One or more microphones are configured to sense incoming acoustic waves from the plurality of speakers and from locally produced acoustic waves from a participant of a conference to generate one or more incoming audio signals. A processor is operably coupled to the plurality of speakers and the one or more microphones. The processor is configured to perform acoustic echo cancelation on the one or more incoming audio signals relative to at least two different channels of the multi-channel audio signal.

22 Claims, 12 Drawing Sheets

METHODS AND APPARATUSES FOR MULTI-CHANNEL ACOUSTIC ECHO CANCELATION

CROSS-REFERENCE TO RELATED APPLICATIONS

This application claims the benefit of: U.S. Provisional Patent Application Ser. No. 61/495,982, filed Jun. 11, 2011 and entitled "Multichannel Acoustical Echo Cancellation," the disclosure of which is incorporated herein in its entirety by this reference.

TECHNICAL FIELD

Embodiments of the present disclosure relate generally to acoustic echo cancelation. More specifically, embodiments of the present disclosure relate generally to methods and apparatuses for conferencing systems using multi-channel acoustical echo cancelation.

BACKGROUND

In conventional conferencing systems there may be coupling between the speakers used to generate acoustic waves from far-end participants and microphones used to sense acoustic waves from near-end participants in a room. This coupling can create an undesirable effect often referred to as echo. Echo may be produced in a conferencing system where a distant participant is involved. The audio from a distant participant is produced at a speaker, which may be picked up at a microphone, and delivered again to the distant participant, who hears an echo of himself with a delay equal to two times the propagation delay over the carrier medium between the near-end and the far-end. Echo is not generally objectionable where the distant participant is located relatively close by (e.g., in the same building) but may become distracting where the echo delay is more than a few milliseconds.

To deal with echo, a traditional method is to use half-duplex operation. With half-duplex, the conferencing system detects the presence of far-side audio (from the distant participant) and effectively turn off the microphone to avoid the distant party's audio being echoed back. This method has the undesirable effect of preventing both parties from speaking simultaneously, and because the local participants cannot interrupt the far-side participant, a conversation tends to have a perceived unnatural flow.

Certain of the more advanced conferencing systems implement an echo canceler, which can effectively solve the problems of echo even where the conference proceeds in full-duplex. This echo cancelation is generally performed by predicting the signal received at the microphone based on the signal produced at the speaker. That predicted signal can be subtracted from the actual signal received at the microphone, theoretically leaving only the audio of any local participants as heard by the distant participants. Predicting the signal to subtract is complex, and is affected by the frequency responses of the speaker and the microphone, as well as echo paths in a room at any given time.

Recently, conferencing systems have been proposed with multiple audio channels. There is a need for new methods and apparatuses for echo cancellation involving the production and sensing for multiple audio channels.

BRIEF SUMMARY

Embodiments of the present disclosure include methods and apparatuses for echo cancellation involving multiple audio channels and the production, sensing, or a combination thereof of multiple audio channels in conferencing systems.

Embodiments of the present disclosure include a method of acoustic echo cancelation in a conferencing system. The method includes generating a plurality of audio channels from a plurality of speakers responsive to a plurality of outgoing audio signals. Incoming acoustic waves are sensed from the plurality of speakers and from locally produced acoustic waves from a participant of a conference to generate one or more incoming audio signal. Acoustic echo cancelation is performed on the one or more incoming audio signals relative to at least two of the plurality of audio channels.

Other embodiments of the present disclosure include a conferencing apparatus with a plurality of speakers configured to generate outgoing acoustic waves responsive to a plurality of outgoing audio signals. One or more microphones are configured to sense incoming acoustic waves from the plurality of speakers and from locally produced acoustic waves from a participant of a conference to generate one or more incoming audio signals. Memory is configured for storing computing instructions. A processor is operably coupled to the plurality of speakers, the one or more microphones, and the memory. The processor is configured to execute the computing instructions to perform acoustic echo cancelation on the one or more incoming audio signals relative to at least two different channels of the plurality of outgoing audio signals.

Still other embodiments of the present disclosure include a conferencing apparatus with a plurality of speakers configured to generate outgoing acoustic waves responsive to a multi-channel audio signal. One or more microphones are configured to sense incoming acoustic waves from the plurality of speakers and from locally produced acoustic waves from a participant of a conference to generate one or more incoming audio signals. A processor is operably coupled to the plurality of speakers and the one or more microphones. The processor is configured to perform acoustic echo cancelation on the one or more incoming audio signals relative to at least two different channels of the multi-channel audio signal.

DETAILED DESCRIPTION

Figure 1:
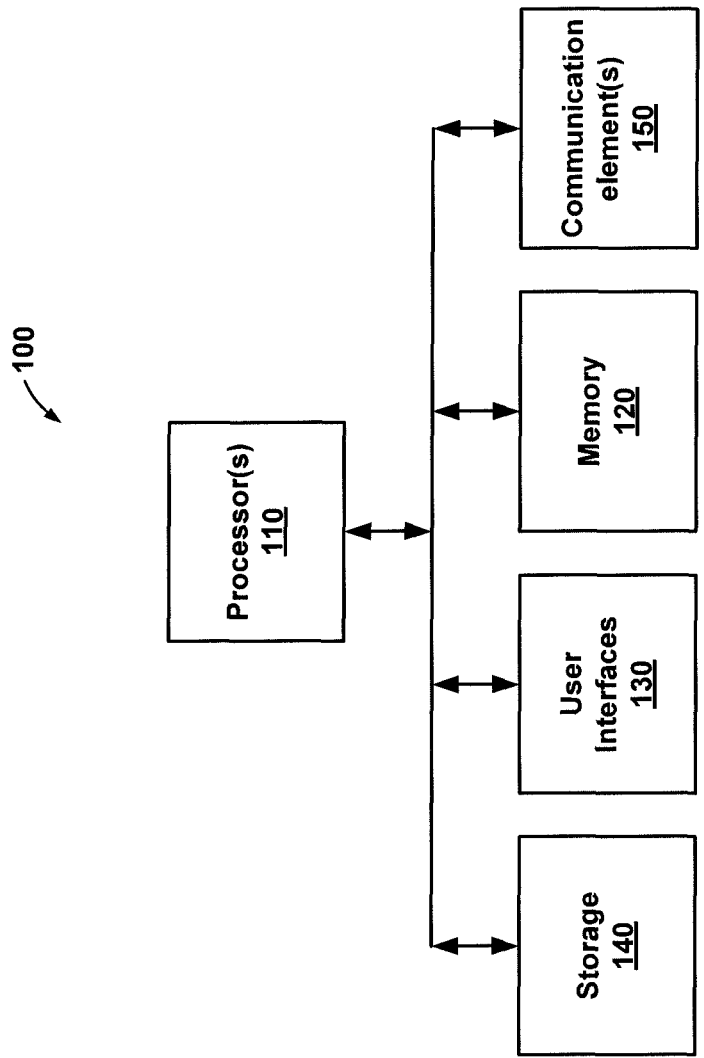
FIG. 1 is a block diagram illustrating a conferencing apparatus according to one or more embodiments of the present disclosure.

In the following description, reference is made to the accompanying drawings in which is shown, by way of illustration, specific embodiments of the present disclosure. The embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor is configured to execute instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

In addition, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be rearranged.

Figure 3:
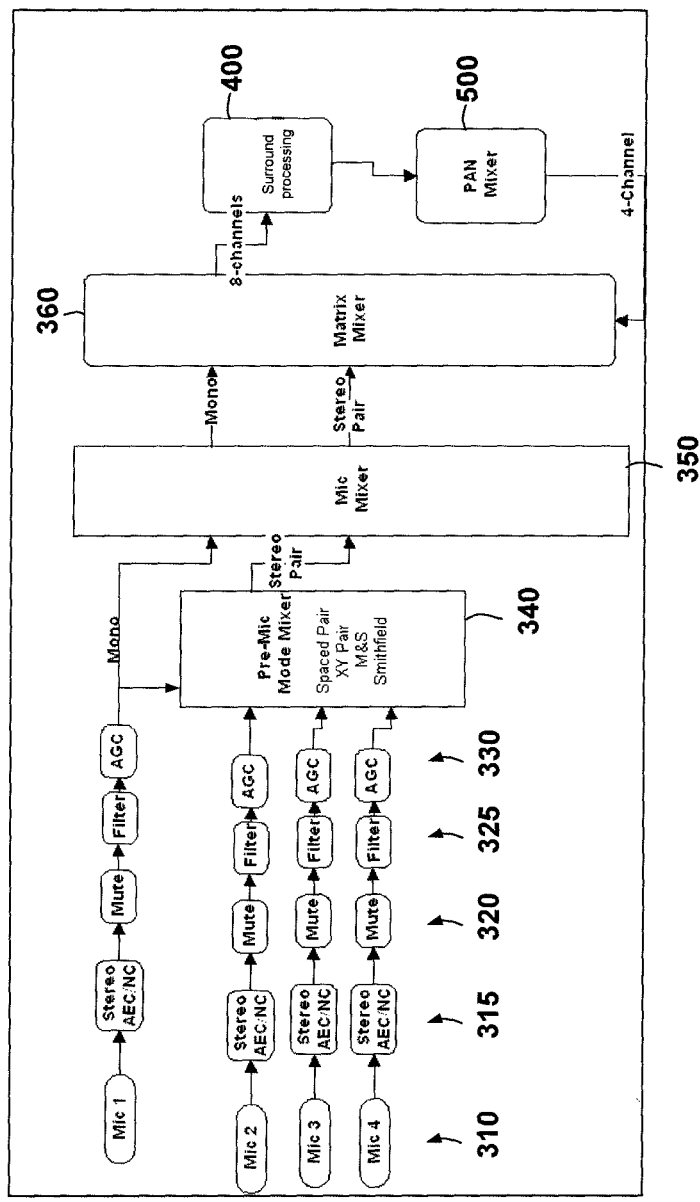
FIG. 3 is a functional flow diagram illustrating some processes that may be used in input mixing and processing according to one or more embodiments of the present disclosure.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include methods and apparatuses for echo cancelation involving multiple audio channels and the production, sensing, or a combination thereof of multiple audio channels in conferencing systems.

FIG. 1 illustrates a conferencing apparatus 100 for practicing embodiments of the present disclosure. The conferencing apparatus 100 may include elements for executing software applications as part of embodiments of the present disclosure. Thus, the conferencing apparatus 100 is configured for executing software programs containing computing instructions and includes one or more processors 110, memory 120, one or more communication elements 150, and user interface elements 130. The system 100 may also include storage 140. The conferencing apparatus 100 may be included in a housing 190.

The one or more processors 110 may be configured for executing a wide variety of applications including the computing instructions for carrying out embodiments of the present disclosure.

The memory 120 may be used to hold computing instructions, data, and other information for performing a wide variety of tasks including performing embodiments of the present disclosure. By way of example, and not limitation, the memory 120 may include Synchronous Random Access Memory (SRAM), Dynamic RAM (DRAM), Read-Only Memory (ROM), Flash memory, and the like.

Information related to the conferencing apparatus 100 may be presented to, and received from, a user with one or more user interface elements 130. As non-limiting examples, the user interface elements 130 may include elements such as displays, keyboards, mice, joysticks, haptic devices, microphones, speakers, cameras, and touchscreens.

The communication elements 150 may be configured for communicating with other devices or communication networks. As non-limiting examples, the communication elements 150 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, and other suitable communication interfaces and protocols.

The storage 140 may be used for storing relatively large amounts of non-volatile information for use in the computing system 100 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), and other equivalent storage devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be stored on the storage 140, transferred to the memory 120 for execution, and executed by the processors 110. The processor 110, when executing computing instructions configured for performing the processes, constitutes structure for performing the processes and can be considered a special-purpose computer when so configured. In addition, some or all portions of the processes may be performed by hardware specifically configured for carrying out the processes.

One particular type of user interface element 130 used in embodiments of the present disclosure is a plurality of microphones, which can be configured to develop a multi-channel input audio stream. Another particular type of user interface element 130 used in embodiments of the present disclosure is a plurality of speakers, which can be configured to develop a multi-channel output audio stream.

Figure 2:
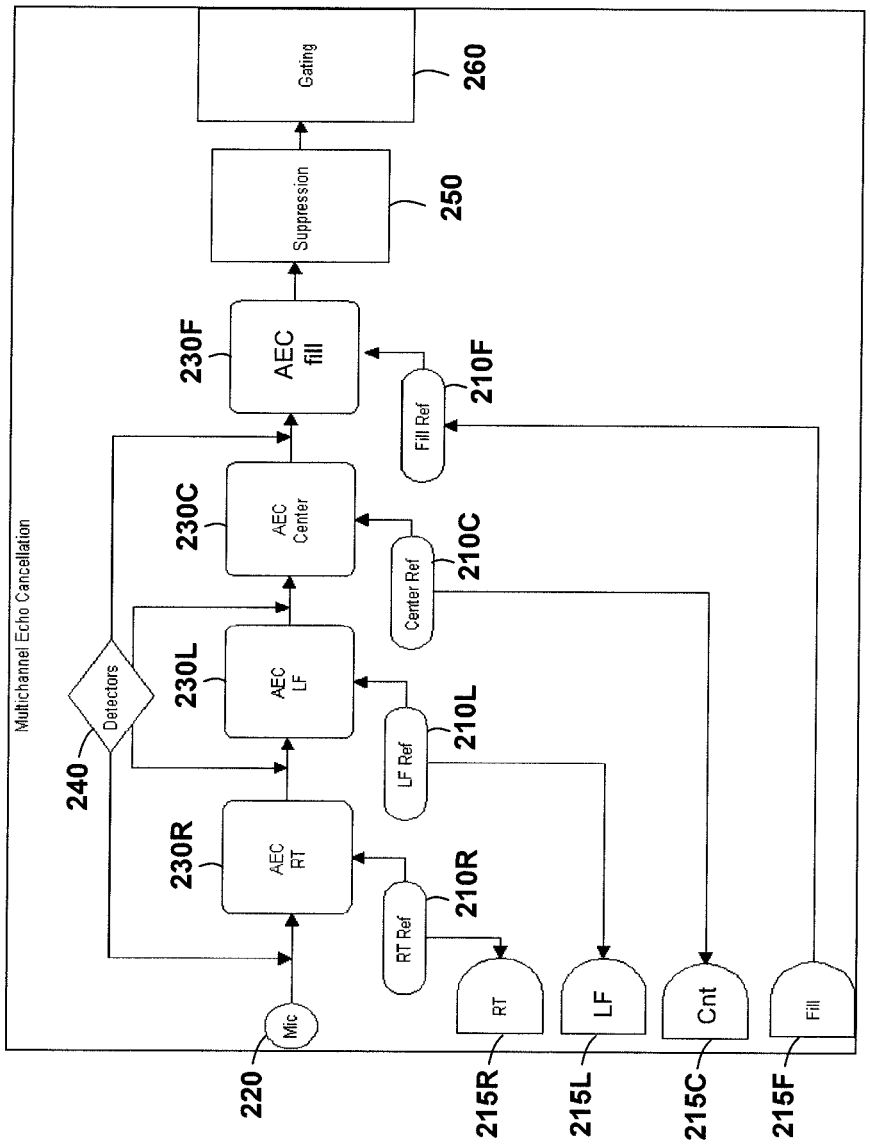
FIG. 2 is a functional flow diagram illustrating some processes that may be used in multi-channel echo cancelation according to one or more embodiments of the present disclosure.

FIG. 2 is a functional flow diagram illustrating some processes that may be used in multi-channel echo cancelation according to one or more embodiments of the present disclosure. One or more microphones 220 sense acoustic waves from their environment. In a multi-channel environment, the conferencing apparatus 100 (FIG. 1) receives information from the far side related to multiple audio channels. Each of these audio channels is output on a speaker. In the non-limiting example of FIG. 2, there is a right speaker 215R for a right channel, a left speaker 215L for a left channel, a center speaker 215C for a center channel, and a fill speaker 215F for a fill channel. These multiple audio channels are also used for a reference in acoustic echo canceling processes for each channel as illustrated by the right reference 210R, the left reference 210L, the center reference 210C, and the fill reference 210F.

Detectors 240 may be used along with these references (210R, 210L, 210C, and 210F) by acoustic echo canceling processes (230R, 230L, 230C, and 230F, respectively) to separately perform the echo canceling operation for each of the audio channels. The non-limiting example of FIG. 2 illustrates a right acoustic echo canceling process 230R responsive to the signal from the microphone 220 and detection results from the detectors 240. A left acoustic echo canceling process 230L is responsive to a signal from the right acoustic echo canceling process 230R and detection results from the detectors 240. A center acoustic echo canceling process 230C is responsive to a signal from the left acoustic echo canceling process 230L and detection results from the detectors 240. A fill acoustic echo canceling process 230F is responsive to a signal from the left acoustic echo canceling process 230L and detection results from the detectors 240. A noise suppression process 250 may be included to further process the final echo-canceled signal from the fill acoustic echo canceling process 230F. A gating process 260 may be included to place the final output signal in a proper stream for transmission.

The non-limiting example of FIG. 2 illustrates one possible process flow using a serial process for echo cancelation of each channel. Embodiments are also contemplated that perform the echo cancelation in a different channel order. Moreover, systems with a different number of output channels may include more echo cancelation processes.

FIG. 3 is a functional flow diagram illustrating some processes that may be used in input mixing and processing according to one or more embodiments of the present disclosure. This non-limiting example illustrates four process chains from four different microphones. Other embodiments may use a different number of microphones and process chains. The processing of FIG. 3 may be configured to create a surround sound multi-channel encoding. The encoding allows the user to direct the conferencing apparatus 100 to create a spatial image of up to four signals. The microphones 310 may each feed an acoustic echo canceling process 315. A mute process 320 may be performed on the result of the echo canceling process 315. A filter process 325 may be applied to the result of the mute process 320. An automatic gain control process 330 may be applied to the result of the filter process 325.

When only a single microphone 310 is available, the processing chain for that microphone directly feeds a microphone mixer process 350. When multiple microphones are available 310, the processing chains for each microphone feeds a pre-mic mode mixer 340. This process 340 may be configured for implementation of various miking techniques to create stereo images through combining microphones to create a Left/Right channel output as a stereo pair. Mixing modes may include mixing for microphones in various configurations, such as, for example, Mid & Side (M&S), Smithfield (4-cardioid), spaced pairs with spot microphones, spaced pairs without spot microphones, and XY microphones. The output of the pre-mic mode mixer 340 feeds the microphone mixer process 350, which combines the results of the pre-mic mixing in various combinations.

A matrix mixer process 360 processes the output of the microphone mixer process 350 (e.g., in mono or stereo format) in combination with a four-channel feedback from a pan-mixer process 380 to expand the signal to up to eight different channels of audio.

A surround processing operation 400 allows the user to direct the conferencing apparatus 100 to create an enhanced spatial image through the use of various signal processing techniques to include amplitude, frequency, and timing modification to include pairs. This processing block will be used to create a pseudo stereo image from mono signals like a telephone channel. A total of eight channels may be made available. Details of the surround processing operation 400 are discussed below with reference to FIG. 4.

The pan-mixer process 500 may be configured to create an encoded surround output. The pan-mixer process 500 can be configured for manual control, automatic control, or a combination thereof. Details of the pan-mixer process 500 are discussed below with reference to FIG. 5.

Figure 4:
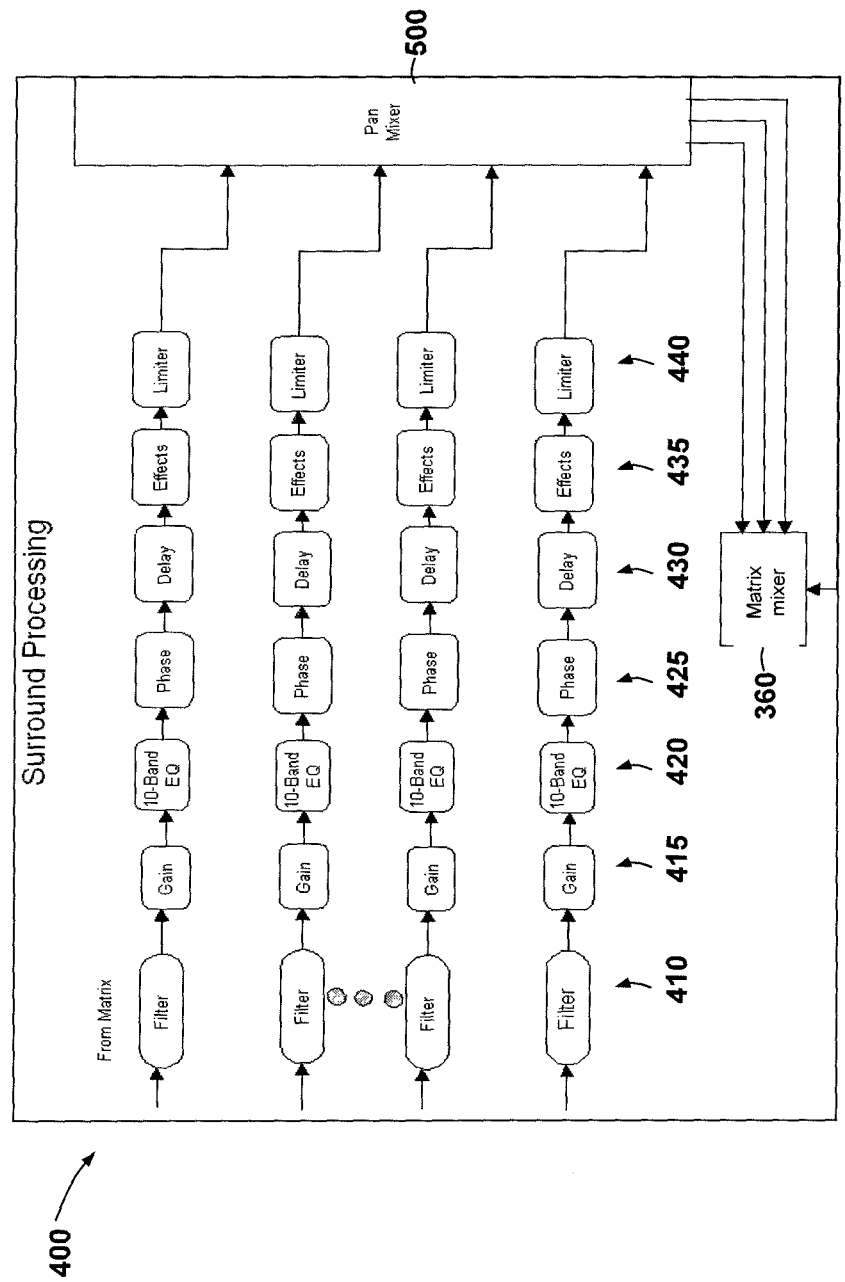
FIG. 4 is a functional flow diagram illustrating some processes that may be used in surround processing according to one or more embodiments of the present disclosure.

FIG. 4 is a functional flow diagram illustrating some processes that may be used in surround processing according to one or more embodiments of the present disclosure. The surround processing operation 400 may include processing chains for up to eight channels. The processing chain for each channel may include a number of optional functions. As non-limiting examples, the processing chains may include a filter operation 410, a gain operation 415, an equalizer operation 420, a phase operation 425, a delay operation 430, an effects operation 435, and a limiter operation 440. Results from the processing chains feed the pan-mixer process 500 as discussed below, and results of the pan-mixer process 500 may be fed back to the matrix mixer 360, as shown in FIG. 3.

Figure 5:
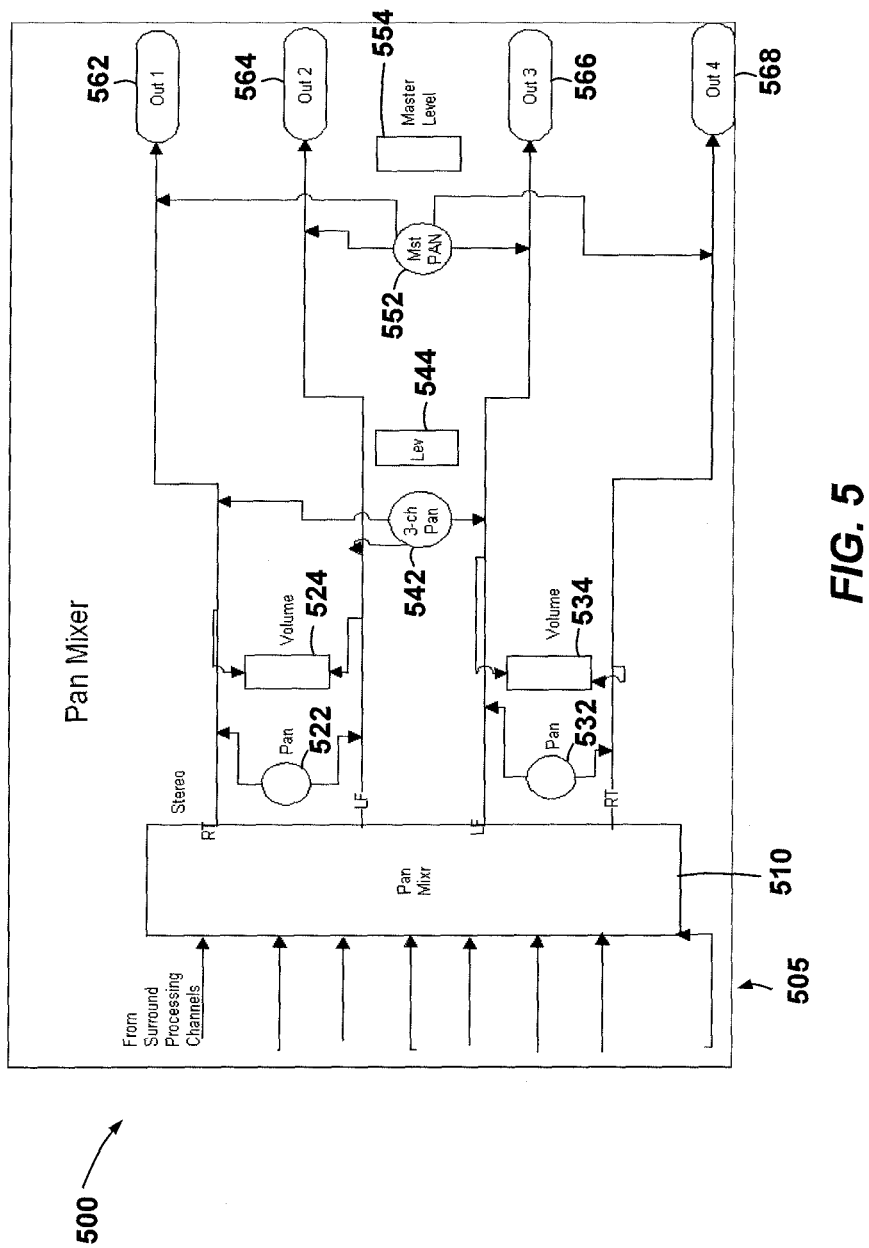
FIG. 5 is a functional flow diagram illustrating some processes that may be used in pan-mixing according to one or more embodiments of the present disclosure.

FIG. 5 is a functional flow diagram illustrating some processes that may be used in pan-mixing according to one or more embodiments of the present disclosure. The pan-mixer process 500 creates an encoded surround output. Signals from the surround processing operation 400 may be combined in a pan-mixer block 510 to generate two stereo channels with each stereo channel including a right channel and a left channel. A pan process 522 and a volume process 524 may be applied to a first stereo channel (shown as the top channel). Similarly, a pan process 532 and a volume process 534 may be applied to a second stereo channel (shown as the bottom channel).

A three-channel pan process 542 and a three-channel level process 544 may be applied to a combination of signals from the first stereo channel and the second stereo channel. A master pan process 552 and a master level process 554 may be applied to a combination of signals from the first stereo channel and the second stereo channel. The resulting output channels (562, 564, 566, and 568) form the final pan-mixed outputs.

The pan-mixer process 500 allows the user to create the four encoded channels from the eight channels delivered from surround processing operation 400. The pan-mixer process 500 includes two functions. A first function creates the audio mix from the eight channels delivered from surround processing operation 400. A second function creates the encoded audio image for various outputs from a mono output to a four-channel output.

The pan-mixer process 500 may be configured for manual control, automatic control, or a combination thereof. Modes on the pan-mixer process 500 may include mono, stereo, three-channel, and four-channel. In mono mode, all pan controls generate a substantially balanced output and volume controls generate a substantially zero gain by performing an eight-to-one mixing of all the channels delivered from surround processing operation 400. In stereo mode, the four outputs will be configured for two stereo pair outputs and associated pan and master volume controls for each pair.

In three-channel mode the pan-mixer process 500 combines the channels delivered from surround processing operation 400 to a right channel, a left channel, and a center channel. This mode may include a single pan control and a single volume control. In four-channel mode, the pan-mixer process 500 controls are tied to all channels with a single master volume. This mode creates four encoded spatial images and a single pan control and a single volume control for the four output channels Each mode allows for manual control or automatic control. In manual control, the user sets the balance and volume for each channel in the encoded output. In automatic control, the conferencing apparatus 100 will create a spatial image through various processing techniques, which may include out-of-phase mixing, stereo widening, gating groups, gate transition, and maximum number of microphones.

In out-of-phase mixing, small amplitudes from opposite channels are mixed into an out-of-phase signal. Stereo widening creates center and side channels by summing and subtracting left and right channel outputs (e.g., C=L+R/2, S=L-R/2) and remixing the left and right channels. In this remixing, the side channel may be inverted and fed back to the right channel and the center channel may be mixed with the left channel. Amplitude and delay modification may be used to enhance a positional image. Gating groups creates a unique spatial image based upon varying the amplitudes on the right and left channel mix.

Gate transition ties the pan-mix process to gate thresholds and decay rates varying amplitude of balance between left and right channels. Maximum number of microphones creates a unique spatial image based on number of microphones gate on at one time.

Figure 6:
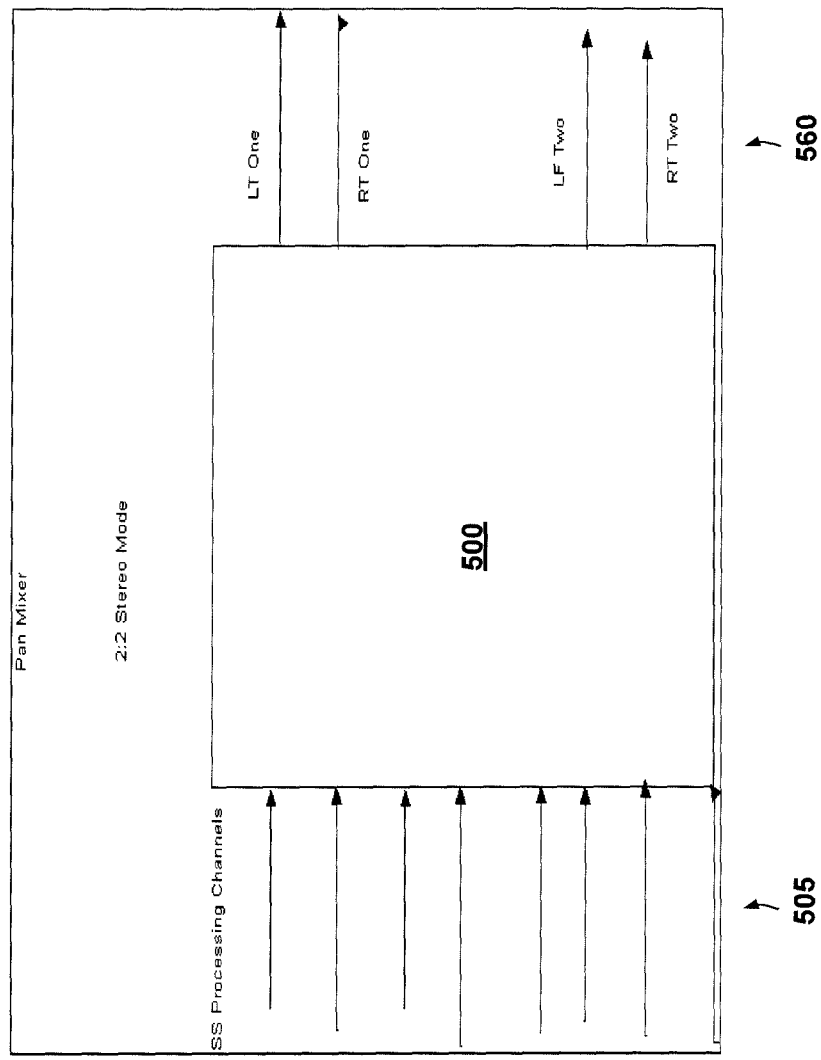
FIG. 6 illustrates pan-mixing for a 2:2 stereo mode.

FIG. 6 illustrates pan-mixing for a 2:2 stereo mode. In this pan-mixing mode, the pan-mixer process 500 uses the channel inputs 605 from the surround processing operation 400 to generate output channels 660 with two stereo pair outputs as left one, right one, left two, and right two.

Figure 7:
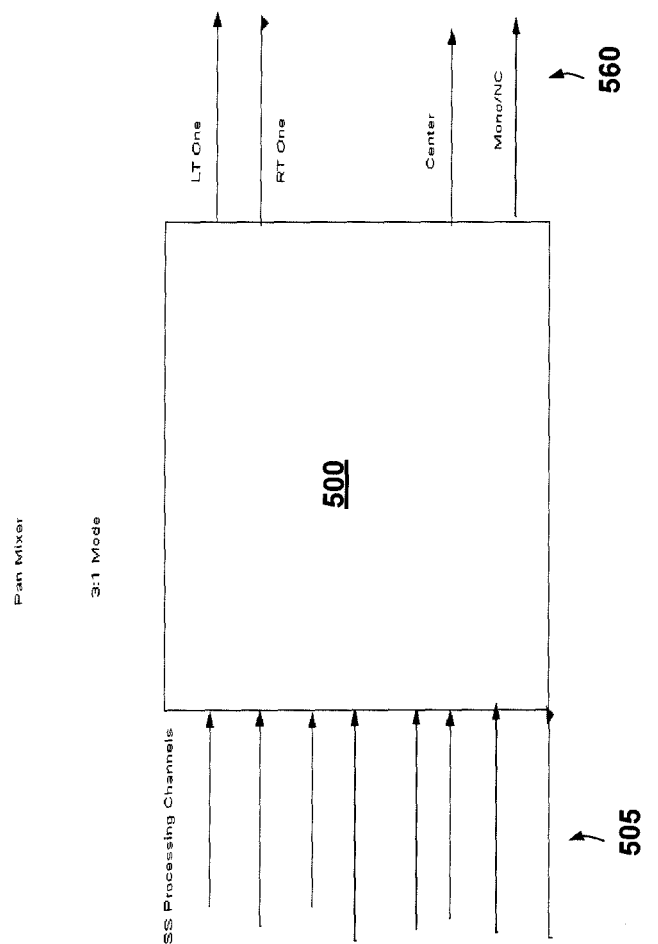
FIG. 7 illustrates pan-mixing for a 3:1 mode.

FIG. 7 illustrates pan-mixing for a 3:1 mode. mode In this pan-mixing mode, the pan-mixer process 500 uses the channel inputs 605 from the surround processing operation 400 to generate output channels 660 with a single stereo pair output as left one and right one, a center channel. The fourth channel may be left unconnected, or carry a mono-channel.

Figure 8:
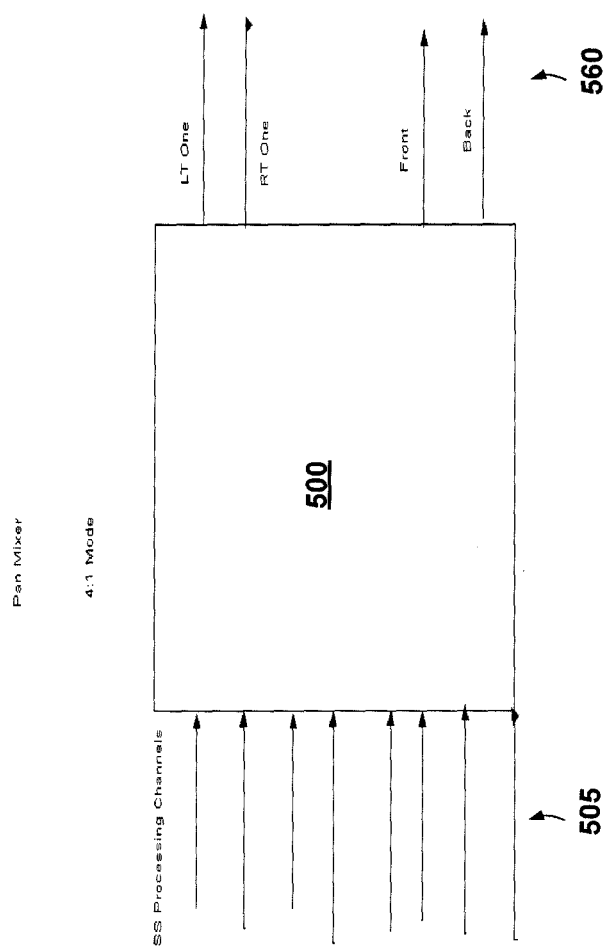
FIG. 8 illustrates pan-mixing for a 4:1 mode.

FIG. 8 illustrates pan-mixing for a 4:1 mode. In this pan-mixing mode, the pan-mixer process 500 uses the channel inputs 605 from the surround processing operation 400 to generate output channels 660 with a single stereo pair output as left one and right one, a front channel, and a back channel.

As discussed earlier, the pre-mic mode mixer 340 allows the user to direct the conferencing apparatus 100 to configure different miking applications used to create stereo audio images. This mixer may include preset modes that route the audio and create the mixes for various defined techniques. The modes may be enhanced through application testing in various rooms creating appropriate amplitude, timing, and phase relationships in the right and left channels. Once created the left and right channels may be maintained through the gating mixer as a single source.

Microphone sampling and mixing techniques include mid-and-side miking. Mixing modes may include mixing for microphones in various configurations, such as, for example, Mid & Side (M&S), Smithfield (4-cardioid), spaced pairs with spot microphones, spaced pairs without spot microphones, and XY microphones.

Figure 9:
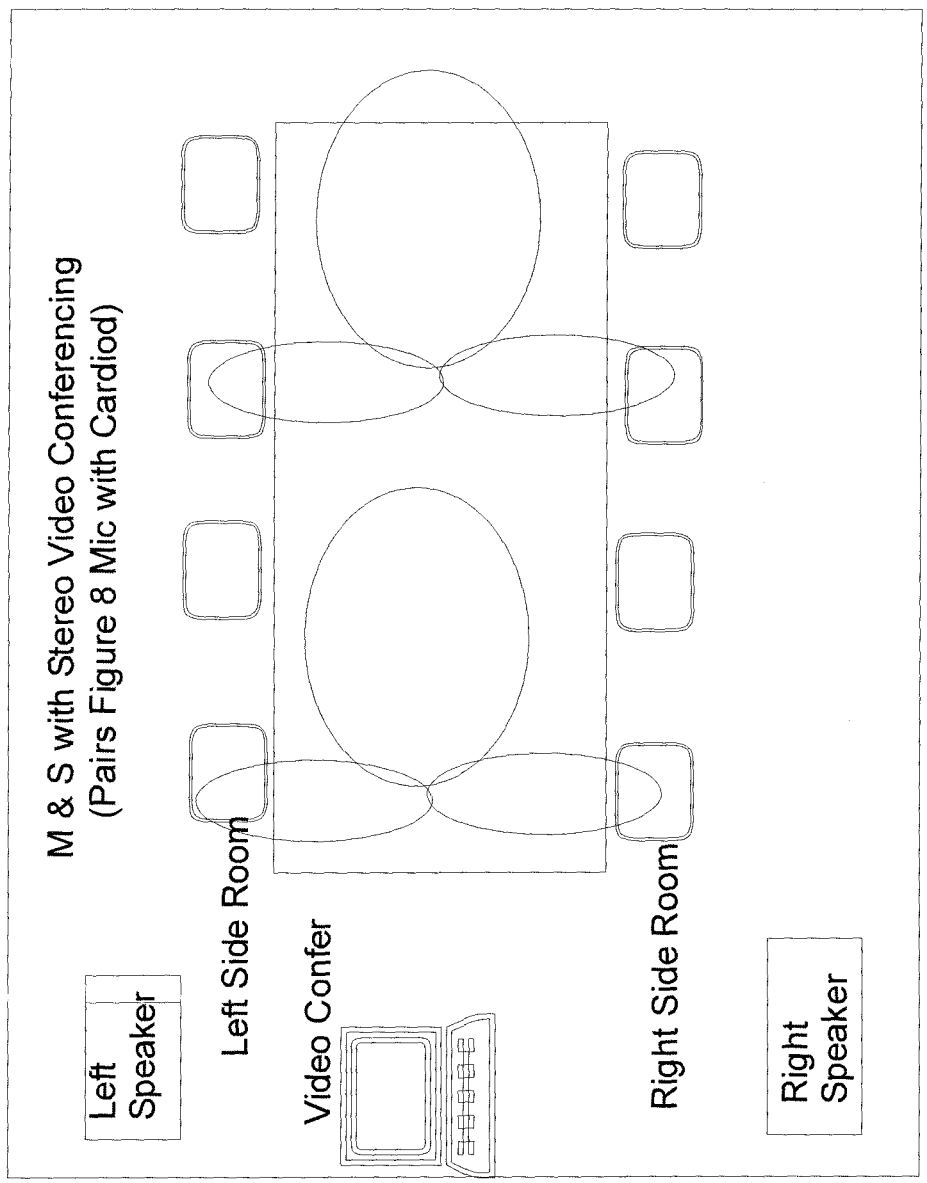
FIG. 9 illustrates a room configuration using multi-channel echo cancelation with figure-eight microphones and cardioid microphones according to one or more embodiments of the present disclosure.

FIG. 9 illustrates a room configuration using multi-channel echo cancelation with figure-eight microphones and cardioid microphones according to one or more embodiments of the present disclosure. This mid-and-side miking technique may use a figure-8 microphone (e.g., a bidirectional microphone)

in conjunction with a cardioid microphone. The microphones may be co-located. The Cardioid microphone signal is mixed proportionally to the left and right channels. The figure-8 microphone creates the right channel in phase and the left channel out of phase.

Figure 10:
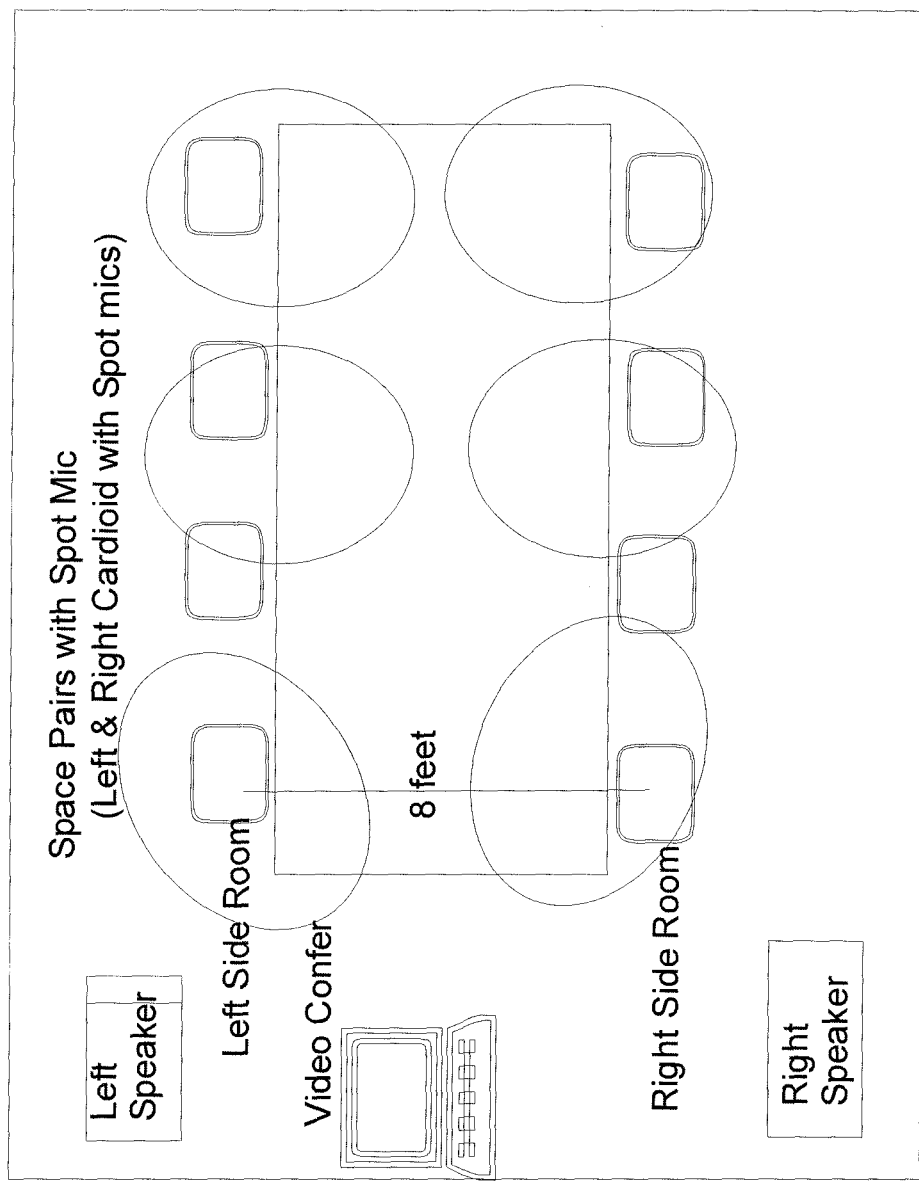
FIG. 10 illustrates a room configuration using multi-channel echo cancelation with cardioid microphones and spot microphones according to one or more embodiments of the present disclosure.

FIG. 10 illustrates a room configuration using multi-channel echo cancelation with cardioid microphones and spot microphones according to one or more embodiments of the present disclosure. This space pair technique uses pairs of cardioid microphones spaced 4 to 8 feet apart. This configuration creates both timing and amplitude image of a speech source. A spot microphone (not shown) can be placed in the image to create point reinforcement in the presentation.

Figure 11:
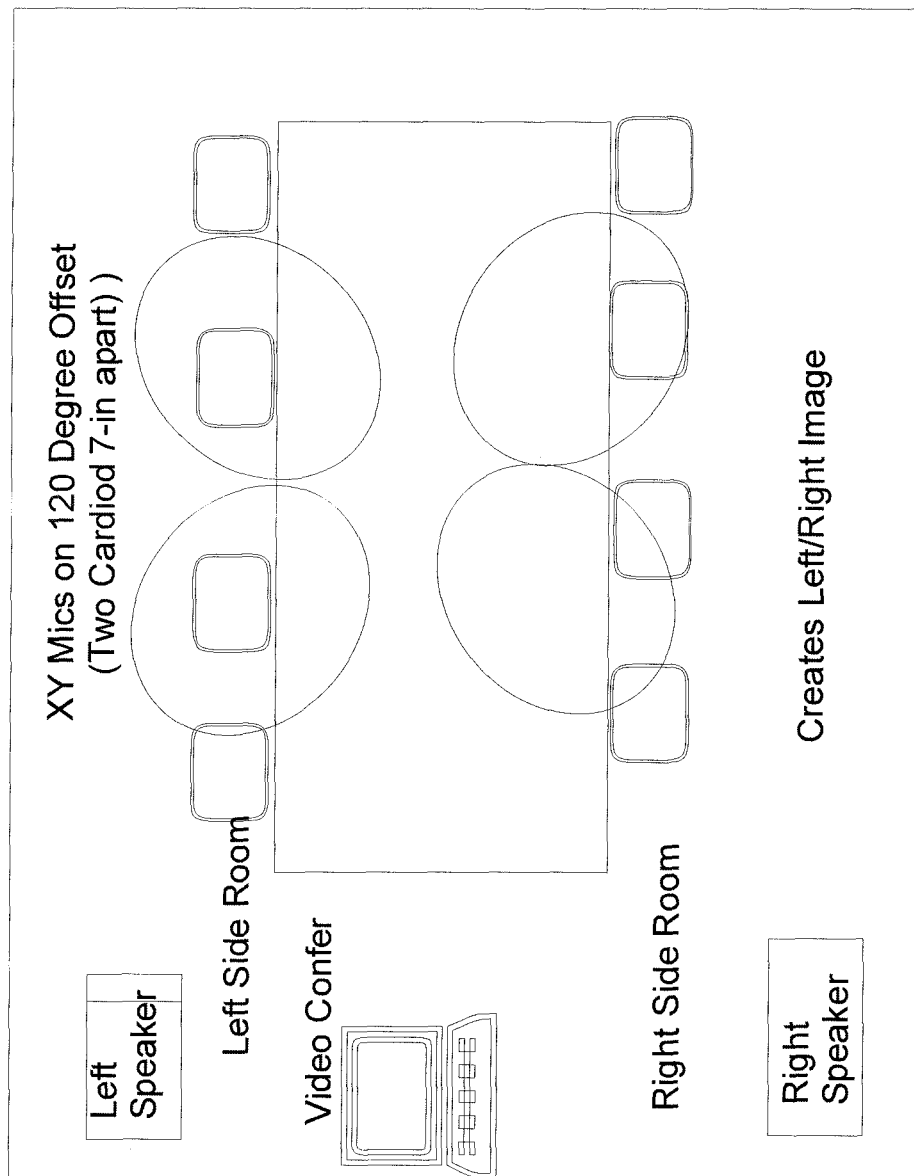
FIG. 11 illustrates a room configuration using multi-channel echo cancelation with two cardioid microphones on 120 degree offsets according to one or more embodiments of the present disclosure.

FIG. 11 illustrates a room configuration using multi-channel echo cancelation with two cardioid microphones on 120-degree offsets according to one or more embodiments of the present disclosure. This XY technique uses two co-located cardioid microphones with offsets between 90 and 180 degrees. The microphones may be spaced about one foot apart to emulate a head model. One microphone creates the right channel and the other microphone created the left channel. Minimal timing differences will be present on the source signals and amplitude variations on the source signals would be related.

Figure 12:
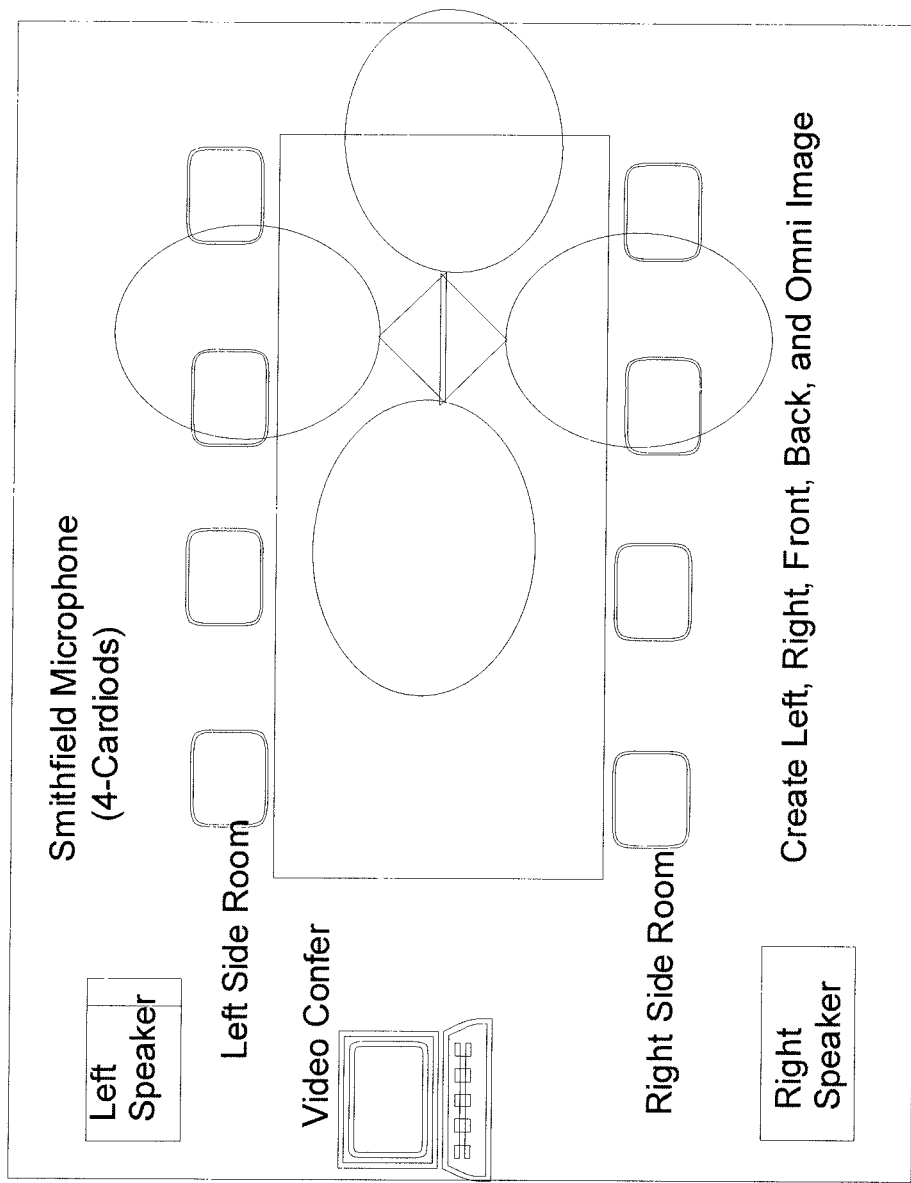
FIG. 12 illustrates a room configuration using multi-channel echo cancelation with four cardioid microphones according to one or more embodiments of the present disclosure.

FIG. 12 illustrates a room configuration using multi-channel echo cancelation with four cardioid microphones according to one or more embodiments of the present disclosure. This Smithfield microphone technique is created by electronically summing adjacent cardioid microphones configured in a co-located tetrahedron shape. Digital summing and subtracting can create a left channel, a right channel, a front channel, a back channel, and an omni-image of the audio source.

User interface software may be included with embodiments of the present disclosure. Some non-limiting interfaces are discussed as examples. A unit view may be included to represent the surround sound processing channels and surround encoder channels. Surround sound processing controls may include gain, mute, equalization, and pan controls. Surround sound encode channels may include mute, master volume, and pan controls.

A channel view may be included to view the surround sound processing and surround sound encoding channels. A matrix view may be included to view the various channels along with microphone input channels resulting from the pre-mic mode mixer. T An acoustic echo canceling (AEC) builder view may be included to set multiple AEC references per microphone channel. This view may include drop down combo list that allow multiple selections to be made based upon channels mode selection (e.g., mono, stereo, 1:3, and 1:4). An AEC property page may be included to show the mode selection between mono, stereo, 1:3, and 1:4.

A surround sound processing page may be included to show various properties, such as, for example: 10-Band equalization, four-node pre-equalization filtering, phase controls allowing phase selections of 45, 90, 180 degrees, delay controls, and limiter controls. The surround sound processing page may show other various properties, such as, for example: effect including On/Off of reverb, Pitch, and shift; and pan controls for gain balance between adjacent pairs.

A surround sound encoding page may be included for controlling encoding modes, (e.g., Mono, Stereo, 3:1, and 4:1 mode selection), manual controls (e.g., a pan rotary know, a master volume slider, and various meters), automatic mode controls to include controls for user selection of various modes (e.g., gating group, gate transition, maximum number of microphones, out-of-phase mixing, and stereo widening).

A pre-gate mixer builder page may be included to allow the user to configure a group of microphone channels to perform various stereo miking techniques. This mixing may include an 8×8 mixer table with cross point controls for routing. In addition, a drop down combo box may be included to allow the user to set pre-defined miking configurations (e.g., spaced pair mode, XY miking mode, M&S Mode, and Smithfield Mode).

A pan-mixer builder page may be included as an 8×4 mixer that allows the user to create a custom mixer for the 4-encoded channel outputs.

Various signal processing algorithms may be used in connection with embodiments of the present disclosure as will be apparent from the above description of the drawings. As non-limiting examples, some of these signal processing algorithms include processes for the surround acoustic echo cancellation. Algorithms for daisy-chained AEC blocks may be included to support various output channels in modes such as, mono, stereo, 1:3, and 1:4. The mono mode would allow a single AEC per microphone channel. The stereo mode would allow a stereo AEC for all eight microphone inputs. The 1:3 mode would allow three AEC operations for channels 1 through 4. Channels 5 through 8 would be disabled in this mode with processing allocations being assigned to the first four channels. The 1:4 mode would allow four AEC for channels 1 through 4. Channels 5 through 8 would be disabled. A single suppression routine may be optimized for the daisy-chain configuration of the AEC blocks.

Other signal processing algorithms include processes for the surround sound channel processing to either create a stereo image or enhance an existing stereo image. Processing functions may include functions to modify amplitude, frequency, and timing of audio signals. Processing blocks may include a four-node pre-equalization filter bank to allow the user to create frequency variations in paired filters. Ten-band equalization processing may be included to allow the user to set amplitude on an octave basis. Phase processing may be included to allow the user to create a phase differential between two signals. Delay processing may be included to allow the user to delay a signal up to 10 msec. Effect processing may be included to enhance a current stereo pair or synthesize a stereo pair from a mono signal. Reverb processing may be included to process various signals based up impulse time. Chorus processing may be included to split mono into two channels and delay one of the channels by less than about five milliseconds (e.g., a Hauss Effect) to create a timing difference. Pitch shift processing may be included to create a stereo image by pitch shifting one channel of a mono input signal. Pan control algorithms may be included for left/right balance control between adjacent channel pairs allowing amplitude difference in the signals. Volume algorithms may be included to apply similar gain stages to adjacent channels.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of acoustic echo cancelation in a conferencing system, comprising: generating a plurality of audio channels from a plurality of speakers responsive to a plurality of outgoing audio signals; sensing incoming acoustic waves from the plurality of speakers and from locally produced acoustic waves from a participant of a conference to generate one or more incoming audio signals; performing acoustic echo cancelation on the one or more incoming audio signals relative to at least two of the plurality of audio channels; performing a mixing and panning feedback loop operation including a mixing operation and a panning operation wherein: the mixing operation comprises combining and processing the one or more incoming audio signals with one or more feedback signals from the panning operation to generate two or more mixed audio channels; and the panning operation comprises processing the two or more mixed audio channels to generate the one or more feedback signals and a plurality of output audio channels.

2. The method of claim 1, wherein performing the acoustic echo cancelation on the one or more incoming audio signals is performed separately for each audio signal of the plurality of outgoing audio signals.

3. The method of claim 1, wherein sensing the incoming acoustic waves comprises sensing with a plurality of directional microphones to generate the one or more incoming audio signals.

4. The method of claim 1, wherein the one or more feedback signals comprise four or more feedback signals such that:
the mixing operation comprises combining and processing the one or more incoming audio signals with the four more feedback signals from the panning operation to generate five or more mixed audio channels; and
the panning operation comprises processing the five or more mixed audio channels to generate the four or more feedback signals and the plurality of output audio channels.

5. The method of claim 1, further comprising transmitting a configuration of the plurality of output audio channels to another conferencing system in communication with the conferencing system.

6. The method of claim 1, wherein the pan and mixing operation generates the plurality of output audio channels in a configuration selected from the group consisting of a two-channel configuration including a left channel and a right channel, a three-channel configuration including a left channel, a right channel, and a center channel, and a four-channel configuration including a left channel, a right channel and at least one rear channel.

7. The method of claim 1, further comprising determining a configuration of the plurality of audio channels from a transmission received from another conferencing system in communication with the conferencing system.

8. A conferencing apparatus, comprising: a plurality of speakers configured to generate outgoing acoustic waves responsive to a plurality of outgoing audio signals; one or more microphones configured to sense incoming acoustic waves from the plurality of speakers and from locally produced acoustic waves from participant of a conference to generate one or more incoming audio signals; a memory configured for storing computing instructions; a processor operably coupled to the plurality of speakers, the one or more microphones, and the memory, the processor configured to execute the computing instructions to: perform acoustic echo cancellation on the one or more incoming audio signals relative to at least two different channels of the plurality of outgoing audio signals; and perform a mixing and panning feedback loop operation including a mixing operation and a panning operation wherein: the mixing operation comprises combining and processing the one or more incoming audio signals with one or more feedback signals from the panning operation to generate two or more mixed audio channels; and the panning operation comprises processing the two or more mixed audio channels to generate the one or more feedback signals and a plurality of output audio channels.

9. The conferencing apparatus of claim 8, wherein the processor is further configured to perform the acoustic echo cancelation on the one or more incoming audio signals separately for each audio signal of the plurality of outgoing audio signal.

10. The conferencing apparatus of claim 9, wherein the processor is further configured to perform the acoustic echo cancelation on the one or more incoming audio signals in series for each audio signal of the plurality of outgoing audio signal.

11. The conferencing apparatus of claim 8, wherein the one or more microphones comprise a plurality of directional microphones.

12. The conferencing apparatus of claim 8, wherein the processor is further configured to perform the mixing and panning operation wherein the one or more feedback signals comprise four or more feedback signals such that: the mixing operation comprises combining the processing the one or more incoming audio signals with the four or more feedback signals such that: the mixing operation comprises combining and processing the one or more incoming audio signals with the four or more feedback signals from the panning operation to generate five or more mixed audio channels; and the panning operation comprises processing the five or more mixed audio channels to generate the four or more feedback signals and the plurality of output audio channels.

13. The conferencing apparatus of claim 8, wherein the processor is further configured to transmit a configuration of the plurality of output audio channels to another conferencing system in communication with the conferencing system.

14. The conferencing apparatus of claim 8, wherein the processor is further configured to perform the pan and mixing operation to generate the plurality of output audio channels in a configuration selected from the group consisting of a two-channel configuration including a left channel and a right channel, a three-channel configuration including a left channel, a right channel, and a center channel, and a four-channel configuration including a left channel, a right channel and at least one rear channel.

15. The conferencing apparatus of claim 8, wherein the processor is further configured to determine a configuration of the multi-channel audio signal from a transmission received from another conferencing system in communication with the conferencing system.

16. A conferencing apparatus, comprising: a plurality of speakers configured to generate outgoing acoustic waves responsive to a multi-channel audio signal; one or more microphones configured to sense incoming acoustic waves from the plurality of speakers and from locally produced waves from a participant of a conference to generate one or more incoming audio signals; and a processor operably coupled to the plurality of speakers and the one or more microphones, the processor configured to: perform acoustic echo cancellation on the one or more incoming audio signals relative to at least two different channels of the multi-channel audio signal; and perform a mixing and panning feedback loop operation including a mixing operation and a panning operation wherein: the mixing operation comprises combining and processing the one or more incoming audio signals with one or more feedback signals from the panning operation to generate two or more mixed audio channels; and the panning operation comprises processing the two or more mixed audio channels to generate the one or more feedback signals and a plurality of output audio channels.

17. The conferencing apparatus of claim 16, wherein the processor is further configured to perform the acoustic echo cancelation on the one or more incoming audio signals separately for each audio channel of the multi-channel audio signal.

18. The conferencing apparatus of claim 16, wherein the one or more microphones comprise a plurality of directional microphones.

19. The conferencing apparatus of claim 16, wherein the processor is further configured to perform the mixing and panning operation wherein the one or more feedback signals comprise four or more feedback signals such that: the mixing operation comprises combining and processing the one or more incoming audio signals with the four or more feedback signals from the panning operation to generate five or more mixed audio channels; and the panning operation comprises processing the five or more mixed audio channels to generate the four or more feedback signals and the plurality of output audio channels.

20. The conferencing apparatus of claim 16, wherein the processor is further configured to transmit a configuration of the plurality of output audio channels to another conferencing system in communication with the conferencing system.

21. The conferencing apparatus of claim 16, wherein the processor is further configured to perform the pan and mixing operation to generate the plurality of output audio channels in a configuration selected from the group consisting of a two-channel configuration including a left channel and a right channel, a three-channel configuration including a left channel, a right channel, and a center channel, and a four-channel configuration including a left channel, a right channel and at least one rear channel.

22. The conferencing apparatus of claim 16, wherein the processor is further configured to determine a configuration of the multi-channel audio signal from a transmission received from another conferencing system in communication with the conferencing system.

* * * * *

UNITED STATES PATENT AND TRADEMARK OFFICE
CERTIFICATE OF CORRECTION

PATENT NO.            : 9,215,327 B2                                  Page 1 of 1
APPLICATION NO.       : 13/493943
DATED                 : December 15, 2015
INVENTOR(S)           : Tracy A. Bathurst et al.

It is certified that error appears in the above-identified patent and that said Letters Patent is hereby corrected as shown below:

IN THE SPECIFICATION

In column 8, line 7, after "channels" insert -- . --.

In column 9, line 47, delete "mixer. T" and insert -- mixer. --, therefor.

In column 10, line 50, delete "Hauss" and insert -- Haas --, therefor.

IN THE CLAIMS

In column 11, line 32, in claim 4, after "four" insert -- or --.

In column 11, line 60, in claim 8, after "from" insert -- a --.

In column 12, line 26-29, in claim 12, after "signals such" delete "that; the mixing operation comprises combining the processing the one or more incoming audio signals with the four or more feedback signals such".

In column 12, line 58, in claim 16, delete "produced" and insert -- produced acoustic --, therefor.

Signed and Sealed this
Fifth Day of April, 2016

Michelle K. Lee
*Director of the United States Patent and Trademark Office*